US 7,077,085 B2

(12) United States Patent
Arai et al.

(10) Patent No.: US 7,077,085 B2
(45) Date of Patent: Jul. 18, 2006

(54) VARIABLE VALVE CONTROL SYSTEM AND METHOD FOR MULTI-CYLINDER INTERNAL COMBUSTION ENGINE

(75) Inventors: Masahiro Arai, Yokohama (JP); Katsuhiko Kawamura, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/084,360

(22) Filed: Mar. 21, 2005

(65) Prior Publication Data

US 2005/0235933 A1    Oct. 27, 2005

(30) Foreign Application Priority Data

Apr. 26, 2004    (JP)    ............... 2004-129462

(51) Int. Cl.
F01L 1/34    (2006.01)
(52) U.S. Cl. ............... 123/90.16; 123/90.15; 701/105; 701/112
(58) Field of Classification Search ............. 123/90.16, 123/90.15
See application file for complete search history.

(56) References Cited

U.S. PATENT DOCUMENTS 6,301,543 B1* 10/2001 Fujiwara et al. ............ 701/114
6,729,280 B1*  5/2004 Muraki ................... 123/90.15
6,920,852 B1*  7/2005 Machida .................. 123/90.16
6,971,350 B1* 12/2005 Akasaka et al. ......... 123/90.16

FOREIGN PATENT DOCUMENTS

JP    2001-280167 A    10/2001
JP    2002-089303 A     3/2002
JP    2002-180856 A     6/2002

OTHER PUBLICATIONS

U.S. Appl. No. 11/106,448, filed Apr. 15, 2005, Arai et al.
U.S. Appl. No. 11/084,255, filed Mar. 21, 2005, Shindou.

* cited by examiner

Primary Examiner—Thomas Denion
Assistant Examiner—Kyle M. Riddle
(74) Attorney, Agent, or Firm—Foley & Lardner LLP (57) ABSTRACT

In variable valve control system and method for a vehicular multi-cylinder internal combustion engine, a first learning timing at which a reference position of a lift characteristic is learned for a first cylinder group is deviated from a second learning timing at which the reference position is learned for a second cylinder group.

20 Claims, 4 Drawing Sheets

VARIABLE VALVE CONTROL SYSTEM AND METHOD FOR MULTI-CYLINDER INTERNAL COMBUSTION ENGINE

BACKGROUND OF THE INVENTION

1. Field of the Invention

The present invention relates to variable valve control system and method for a (vehicular) multi-cylinder internal combustion engine in which a variably operated valve mechanism which continuously varies a lift characteristic of an intake valve or an exhaust valve is equipped for each of a plurality of cylinder groups and, particularly, relates to a technique of a correction or learning (corrective learning) process of a reference position of the above-described lift characteristic.

2. Description of the Related Art

In an internal combustion engine, particularly, in a gasoline internal combustion engine which develops an output in accordance with an intake air quantity, a variably operated valve mechanism which varies a lift characteristic of an intake valve in accordance with an engine driving condition has been used in order to improve a fuel consumption. A Japanese Patent Application First Publication No. 2002-180856 published on Jun. 26, 2002 exemplifies a previously proposed variable valve control system in which a hydraulic pressure driven variable operated valve mechanism which modifies a rotational phase of a camshaft with respect to a crankshaft to enable a continuous modification of a valve timing is installed. An actual phase angle of the camshaft is detected by means of a crank angle sensor and a cam angle sensor. This Japanese Patent Application First Publication describes that, during a fuel supply cut-off at a time of a vehicle deceleration, the camshaft is placed at a most retarded angle position, the lift characteristic is minimized, a learning process for a sensor output reference position is carried out, and, in this way, under a situation that the fuel supply is stopped, the learning process is carried out so that an increase in the fuel consumption is eliminated and the fuel consumption can be improved.

SUMMARY OF THE INVENTION

It is necessary to set a mechanical minimum position of the lift characteristic of a control shaft further smaller than a minimum target position of a control range when an angular position of the control shaft of the camshaft is accurately closed loop controlled or feedback controlled on the basis of a sensor output. The mechanical minimum position limited by a stopper is not used during an ordinary engine driving. Hence, if a rotational position of the control shaft were the mechanical minimum position to correctively learn the sensor output during an actual engine operation, an intake air quantity might become excessively decreased and a combustion state might become unstable. In addition, even during a fuel supply cut-off as disclosed in the above-described Japanese Patent Application First Publication, it becomes difficult to secure combustion stability and responsive characteristic during a fuel recovery at which a fuel supply (fuel injection) to the engine is resumed. Especially, a variable valve event-and-lift mechanism by which at least one of a valve lift (quantity) of the intake valve and a working angle thereof as the lift characteristic is modifiable has a tendency of remarkably reducing the intake air quantity if at least one of the valve lift (quantity) and the working angle becomes minimum. Furthermore, if, in a multi-cylinder internal combustion engine having a plurality of cylinder groups such as a V-shaped engine, the lift characteristics are wholly and simultaneously set to minimum at one time in order to carry out the corrective learning for the plurality of cylinder groups, the intake air quantity becomes easy to be excessively small.

It may be considered that the minimum value of the lift characteristic itself is made high to prevent the excessively small intake air quantity when the reference position is correctively learned. In this case, it is not desirable since a control range for the lift characteristic is limited.

It is, therefore, an object of the present invention to provide variable valve control system and method for a vehicular multi-cylinder internal combustion engine which are capable of preventing the excessive reduction of the intake air quantity when the reference position is correctively learned without a limitation of the control range of the lift characteristic.

The above-described object can be achieved by providing a variable valve control system for a vehicular multi-cylinder internal combustion engine, comprising: a variably operated valve mechanism that continuously varies a lift characteristic of an engine valve for each of a plurality of cylinder groups including at least a first cylinder group and a second cylinder group; a detecting section that detects the lift characteristic of the engine valve; and a learning section that manipulates a valve lift quantity for each of the first and second cylinder groups in such a manner that the lift characteristic of the engine valve by the variably operated valve mechanism provides a predetermined characteristic under a predetermined learning driving state and correctively learns a reference position of the lift characteristic on the basis of an output signal of the detecting section, a first learning timing at which the reference position is learned for the first cylinder group being deviated from a second learning timing at which the reference position is learned for the second cylinder group.

The above-described object can also be achieved by providing a variable valve control method for a vehicular multi-cylinder internal combustion engine, comprising: providing a variably operated valve mechanism that continuously varies a lift characteristic of an engine valve for each of a plurality of cylinder groups including at least a first cylinder group and a second cylinder group; providing a detecting section that detects the lift characteristic of the engine valve; manipulating a valve lift quantity for each of the first and second cylinder groups in such a manner that the lift characteristic of the engine valve by the variably operated valve mechanism provides a predetermined characteristic under a predetermined learning driving state; and correctively learning a reference position of the lift characteristic on the basis of an output signal of the detecting section, a first learning timing at which the reference position is learned for the first cylinder group being deviated from a second learning timing at which the reference position is learned for the second cylinder group.

This summary of the invention does not necessarily describe all necessary features so that the invention may also be a sub-combination of these described features.

DETAILED DESCRIPTION OF THE PREFERRED EMBODIMENT

Reference will hereinafter be made to the drawings in order to facilitate a better understanding of the present invention.

Figure 1:
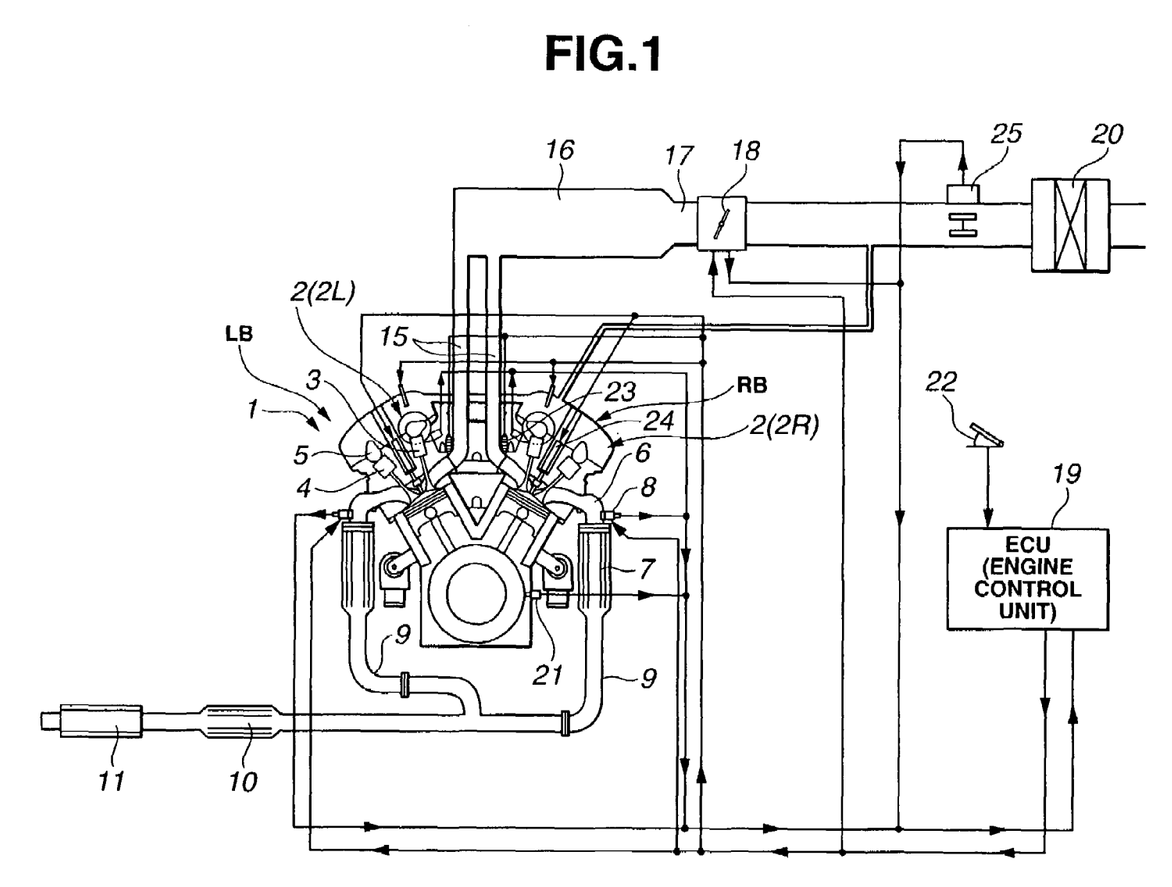
FIG. 1 is a configuration view of a vehicular V-shaped multi-cylinder internal combustion engine to which a variable valve control system in a preferred embodiment according to the present invention is applicable.

A preferred embodiment of a variable valve control system according to the present invention which is applicable to intake valves of a vehicular spark ignited gasoline internal combustion engine will be described below. FIG. 1 shows the embodiment of the variable valve control system according to the present invention which is applicable to a V-shaped six-cylinder gasoline internal combustion engine.

In FIG. 1, a variably operated valve mechanism 2 (2R, 2L) as will be described later is installed on an intake valve 3 of each of left and right banks RB, LB. It is noted that an operated mechanism on an exhaust valve 4 is a direct drive type which drives exhaust valve 4 by means of an exhaust camshaft 5 and its valve lift characteristic is always constant.

An exhaust manifold 6 of each of left and right banks LB, RB is connected to a catalytic converter 7 and air-fuel ratio sensors 8 to detect an exhaust gas air-fuel ratio are disposed at upstream positions with respect to the corresponding catalytic converters 7. Exhaust passages 9 of left and right banks LB, RB are joined together at a portion downstream with respect to catalytic converters 7. A second catalytic converter 10 and a muffler 11 are disposed at a further downstream position with respect to a juncture of exhaust passages 9.

Branch passages 15 are connected to intake ports of respective cylinders and an upper end of each of six branch passages 15 is connected to a collector 16. An intake inlet passage 17 is connected to one end of collector 16. An electronically controlled throttle valve 18 is installed at intake inlet passage 17. This electronically controlled throttle valve 18 includes an actuator, for example, constituted by an electric motor. A control signal from an engine control unit (ECU) 19 controls a throttle opening angle. A sensor (not shown) to detect an actual opening angle of throttle valve 18 is integrated with electronically controlled throttle valve 18. On the basis of a detection signal of this sensor, the throttle opening angle is closed loop controlled to a target opening angle. An airflow meter 25 to detect an intake air quantity is disposed at an upstream side of throttle valve 18 and an air cleaner 20 is disposed at a portion upstream with respect to airflow meter 25.

In addition, a crank angle sensor 21 is installed on a crankshaft of the engine to detect an engine speed and a crank angular position. An accelerator opening angle sensor 22 is installed to detect an accelerator pedal opening angle (depression depth) of an accelerator pedal. These detection signals are inputted into engine control unit 19 together with detection signals of airflow meter 25 and air-fuel ratio sensor 8. Engine control unit 19 controls injection quantity and injection timing of a fuel injection valve 23 for each cylinder, an ignition timing through a spark plug 24 for each cylinder, a valve lift characteristic through variably operated valve mechanism 2, and the opening angle of electronically controlled throttle valve 18.

Next, a structure of variable operated valve mechanism 2 for intake valve 3 will be described with reference to FIG. 2. This variably operated mechanism 2 is a combination of variable valve event-and-lift mechanism 51 and a phase variable mechanism 71. Variable valve event-and-lift mechanism 51 serves to vary a lift (quantity or degree) and working angle of intake valve 3. Phase variable mechanism 71 serves to advance or retard a phase of a center angle of the lift (a phase with respect to the crankshaft (not shown)).

At first, variable valve event-and-lift mechanism 51 will be described. This variable valve event-and-lift mechanism 51 is disclosed in Japanese Patent Application First Publications No. 2001-280167 published on Oct. 10, 2001 and No. 2002-89303 Published on Mar. 27, 2002. This variable valve event-and-lift mechanism 51 includes: an intake valve 3 slidably disposed on a cylinder head; a drive shaft 52 rotatably supported on a cam bracket (not shown) disposed on an upper part of the cylinder head; a drive eccentric shaft portion 53 fixed to drive shaft 52 by means of a press fit; a control shaft 62 disposed on an upper position of drive shaft 52, rotatably supported by means of the same cam bracket, and disposed in parallel to drive shaft 52; a rocker arm 56 swingably supported on control shaft eccentric shaft portion 68 of this control shaft 62 (so as to enable a swing thereof); and a swing (or eccentric) cam 59 contacted with a tappet 60 disposed on an upper end of each intake valve 3. Drive eccentric shaft portion 53 and rocker arm are linked together by means of a ring shaped link 54 as a first link. Rocker arm 56 and swing cam 59 are linked together with a rod shaped link 58 as a second link.

Drive shaft 52 is driven by means of the engine crankshaft via a timing chain or a timing belt as will be described later. Drive eccentric shaft portion 53 has a circular outer peripheral surface. A center of the circular outer peripheral surface is offset from a shaft center (axis center) of drive shaft 52 by a predetermined quantity. An annular portion of ring shaped link 54 is rotatably fitted to the circular outer peripheral surface. Rocker arm 56 has a substantial center part which is swingably supported by means of control eccentric shaft portion 68. One end portion of rocker arm 56 is linked to an arm portion of ring shaped link 54 via a linkage pin 55. The other end portion of rocker arm 56 is linked to an upper end portion of rod shaped link 58 via a linkage pin 57. Control eccentric shaft portion 68 is eccentric from the shaft center of control shaft 62. Hence, in accordance with the angular position of control shaft 62, a swing center of rocker arm 56 is varied.

Swing cam 59 is fitted to the outer peripheral surface of drive shaft 52 and rotatably supported on drive shaft 52. A side extended end of swing cam 59 is associated (linked) with a lower end portion of rod shaped link 58 via a linkage pin 67. A basic circular surface forming a concentric arc to drive shaft 52 and a cam surface extended from basic circular surface drawing a predetermined curve are continuously formed on a lower surface of swing cam 59. These basic circular surface and cam surface are contacted with an upper surface of tappet 60 in accordance with a swing position of swing cam 59. That is to say, the basic circular surface is a base circle interval at which the lift (the lift quantity or a lift degree) is zero. When swing cam 59 is swung so that the cam surface is contacted with tappet 60, tappet 60 is gradually lifted. It is noted that a slight ramp interval is provided between the base circle interval and lift interval.

Figure 2:
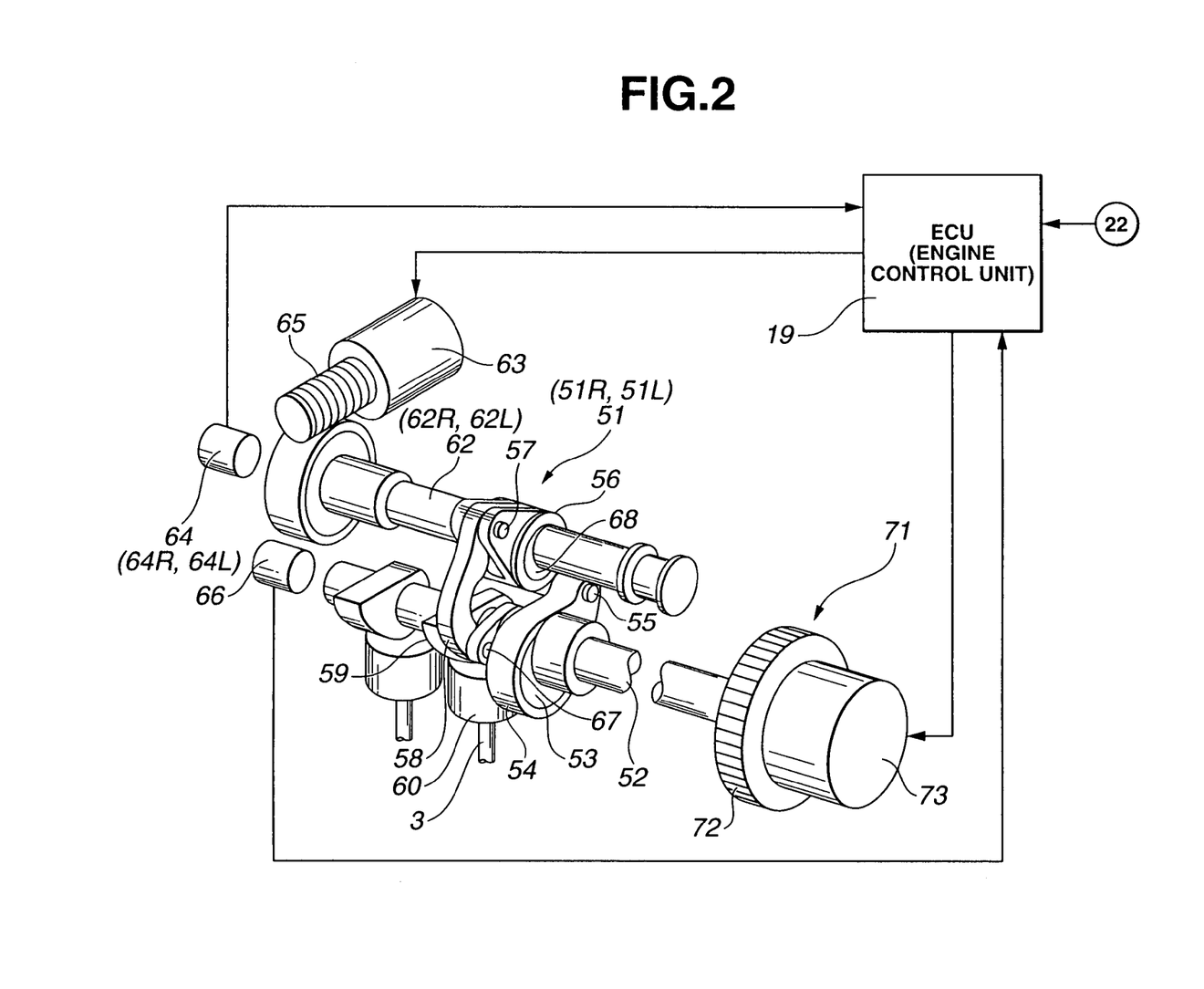
FIG. 2 is a rough perspective view of the variable valve control system in the preferred embodiment shown in FIG. 1.

Control shaft 62 is contacted so as to be rotated within a predetermined angular range by means of a lift-working angle control purpose actuator 63 provided on one end portion of control shaft 62, as shown in FIG. 2. This lift-working angle control purpose actuator 63 includes, for example, a servo motor to drive control shaft 62 via a worm gear 65 and is controlled by a control signal from an engine control unit 19. It is noted that a rotational angle of control shaft 62 is detected by means of a control shaft sensor 64.

An operation of variable valve event-and-lift mechanism 51 will be described below. When drive shaft 52 is rotated, a cam action of drive eccentric shaft portion 53 causes ring shaped link 54 to move upward and downward (move vertically). This involves a swing of rocker arm 56. This swing motion of rocker arm 56 is transmitted to swing cam 59 via rod shaped link 58 so as to be swung. The cam action of this swing cam 59 presses tappet 60 under pressure so that intake valve 3 is lifted.

When an angle of control shaft 62 is varied via lift-working angle control purpose actuator 63, an initial position of rocker arm 56 is varied and, consequently, an initial swing position of swing cam 59 is varied. For example, when control eccentric shaft portion 68 is placed at an upper position as viewed from FIG. 2, rocker arm 56 is wholly placed at the upper position so that an end portion of swing cam 59 located at linkage pin 67 is lifted in the relatively upward direction. In other words, the initial position of swing cam 59 is slanted in a direction separated from tappet 60. Hence, when swing cam 59 is swung along with the rotation of drive shaft 52, the base circular surface is continued for a long time to be contacted with tappet 60 and an interval of time during which the cam surface is contacted with tappet 60 is short. Hence, the lift (quantity or degree) becomes wholly small so that the working angle, viz., an angular range from a valve opening timing to a valve closure timing is contracted. On the contrary, when control eccentric shaft portion 68 is placed at a lower position as viewed from FIG. 2, rocker arm 56 is wholly placed at the lower position so that an end portion of swing cam 59 located at linkage pin 67 is relatively pressed downward. In other words, the initial position of swing cam 59 is slanted in the direction in which the cam surface of swing cam 59 is slanted in the direction in which the cam surface of swing cam 59 approaches to tappet 60. Hence, when, along with the rotation of drive shaft 52, swing cam 59 swings, a portion of swing cam 59 swings, a portion of swing cam 59 which is contacted with tappet 60 is immediately transferred from the base circular surface to the cam surface. Hence, the lift (quantity or degree) wholly becomes large and its working angle becomes expanded. Since the initial position of control eccentric shaft portion 68 can continuously be varied, a valve lift characteristic is continuously varied. In other words, the lift and the working angle can simultaneously and continuously be expanded or contracted. Although dependent upon a layout of each part, for example, when magnitudes of the lift and working angle are varied, the open timing of intake valve 3 and the closure timing thereof are substantially symmetrically varied.

Next, phase variable mechanism 71 includes: as shown in FIG. 2, a sprocket 72 installed at a front end portion of drive shaft 52; and a phase control purpose actuator 73 which relatively rotates sprocket 72 and drive shaft 52 within a predetermined angular range. Sprocket 72 is interlocked with the crankshaft via a timing chain (not shown) or a timing belt (not shown). Phase control purpose actuator 73, for example, is constituted by a hydraulic or electromagnetic rotary actuator and is controlled according to a control signal from engine control unit (ECU) 19. The action of phase control purpose actuator 73 causes the relative rotation between sprocket 72 and drive shaft 52 so that a lift center angle in the valve lift is advanced or retarded. In other words, although the characteristic curve itself of the lift characteristic is not varied, the whole lift characteristic is advanced or retarded. In addition, this variation can continuously be obtained. A control state of phase variable mechanism 71 is detected by means of a drive shaft sensor 66 which responds to the rotational position of drive shaft 52.

As described above, since variably operated valve mechanism 2 includes variable valve event-and-lift mechanism 51 and phase variable mechanism 71, a combination of controls of both mechanisms permits a continuous and remarkable variable control of valve lift characteristic of intake valve 3, especially, an intake valve open timing (IVO) and an intake valve closure timing (IVC). For example, it is possible to control an intake air quantity by means of the variable control of intake valve 3 independently of throttle valve 18. With the opening angle of throttle valve 18 maintained at approximately constant so that a pressure within collector 16 indicates a predetermined negative pressure, viz., becomes a negative pressure of a minimum requirement (for example, −50 mmHg), it is possible for a final control of the intake air quantity to be carried out by variably operated valve mechanism 2. In this way, if the opening angle of throttle valve is sufficiently largely maintained, the engine provides a substantial throttle-less drive and a pumping loss is remarkably reduced. In addition, since the negative pressure of the minimum requirement is secured within collector 16, various systems utilizing the negative pressure such as a blowby gas recirculation can directly be applied without remarkable modifications.

As described above, when the angular position of control shaft 62 is, with a high accuracy, feedback controlled (closed loop controlled), it is necessary to set a mechanical minimum position of the rotation position of control shaft 62 to be further smaller than a minimum target position of its control range. A mechanical minimum position limited by means of a stopper is not used during an ordinary engine driving. Hence, if during an actual operation of the engine such as an idling state driving or extremely low load driving, the rotation position of the control shaft were at a minimum position in order to correctively learn the sensor output, a combustion state might remarkably be unstable. Hence, it is desirable to carry out the sensor learning during such a fuel supply cutoff as in the case of a vehicular deceleration. However, if, even during the fuel supply cutoff, the rotational position of the control shaft is set to the minimum position to make the sensor learning, it is difficult to obtain a desired intake air quantity during a fuel recovery to resume the engine actual operation with a fuel injection started, for example, as in a case where the driver depresses the accelerator pedal during the sensor learning. The reductions of a combustion stability and of a responsive characteristic may be introduced. On the other hand, if the minimum position of control shaft 64 corresponding to the minimum position of the lift characteristic is made high, the rotation range of control shaft 62, viz., the control range of the lift characteristic is limited. Hence, it is not desirable.

As shown in FIG. 2, in the V-shaped internal combustion engine, right bank RB and left bank LB are installed as cylinder groups or cylinder rows. Each component corresponding to right bank RB has added reference sign of R and each component corresponding to left bank LB has added reference sign of L. Variable valve event-and-lift mechanisms 51R and 51L are installed for respective left and right banks LB, RB. The operation of each control shaft 62R, 62L is independently controllable on the basis of the output signal of each control shaft sensor 64R, 64L.

One of features of this embodiment is on a corrective learning of an output reference position of each control shaft sensor 64R, 64L is, as shown in FIGS. 4A through 4E, a first learning time tR at which variable valve event-and-lift mechanism 51R of right bank RB is correctively learned is mutually different from a second learning timing tL at which variable valve event-and-lift mechanism 51L of left bank LB is correctively learned so that the reduction in the intake air quantity is suppressed, namely, the intake air quantity is leveled. Thus, with no limitation on the control range of the lift characteristic, the improvements in the combustion stability and in the responsive characteristic during the fuel recovery can be achieved.

Figure 3:
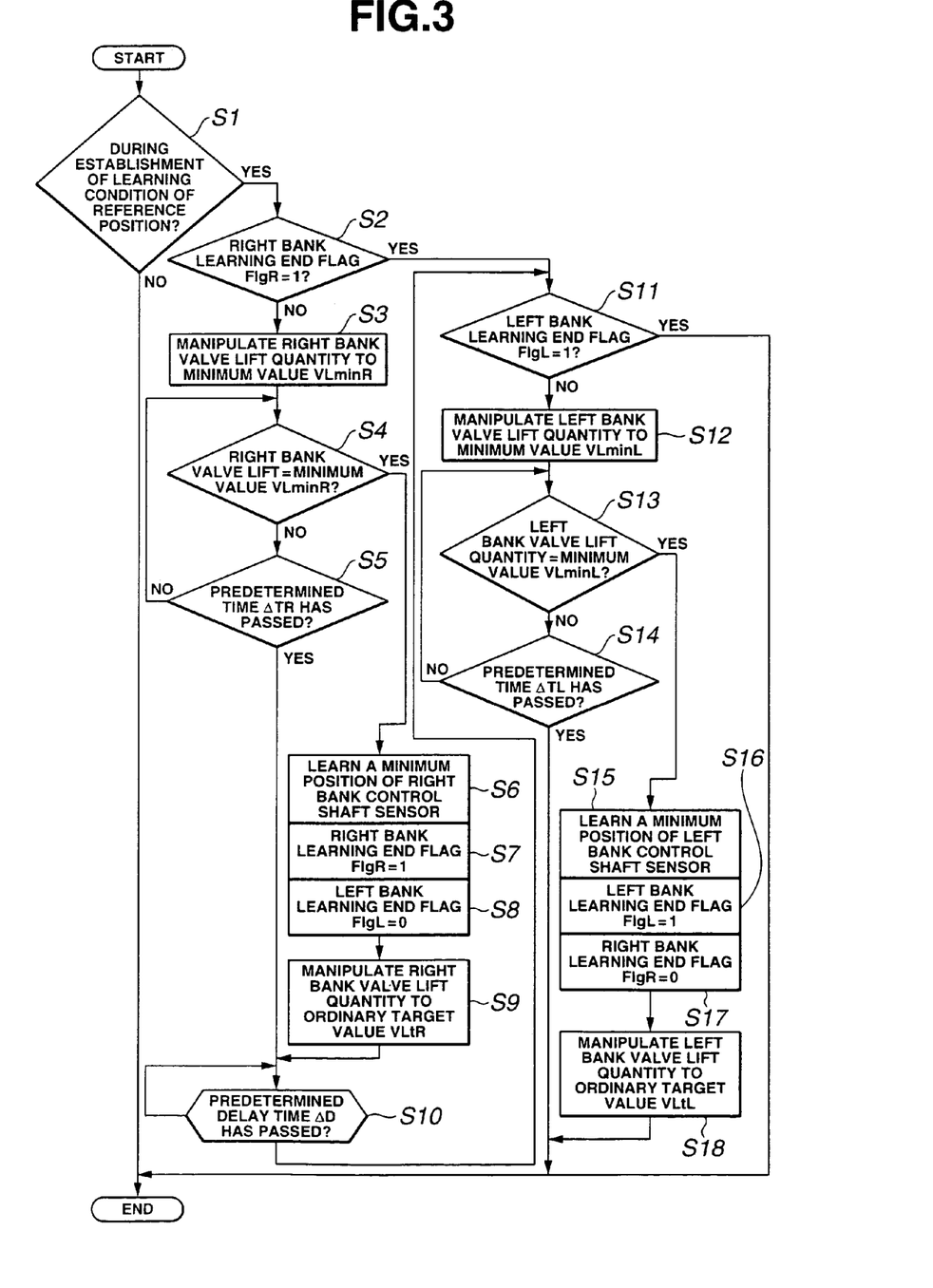
FIG. 3 is a flowchart representing a flow of a learning control (a learning driving mode) executed in the variable valve control system shown in FIG. 2.

A specific control flow of this embodiment will be described with reference to a flowchart shown in FIG. 3 and an integrated timing chart shown in FIGS. 4A through 4E. A routine shown in FIG. 3 is executed and stored in engine control unit (ECU) 19. Engine control unit 19 includes a microcomputer having a CPU (Central Processing Unit), a ROM (Read Only Memory), a RAM (Random Access Memory), an Input Port, an Output Port, and a common bus.

At a step S1, engine control unit 19 determines whether a sensor output reference position learning condition is established, namely, the present time is in a predetermined learning driving condition. This learning condition at least includes such a condition that the present time is during a fuel supply cut-off as in a case of a vehicular deceleration during which a fuel supply (injection) is inhibited. For example, the fuel supply cut-off is carried out when the accelerator pedal is not depressed on the basis of the detection signal from accelerator opening angle sensor 22 and the brake pedal is depressed. The other learning condition includes such a condition that control shafts 62R, 62L of left and right banks LB, RB are normally operated.

Figure 4A:
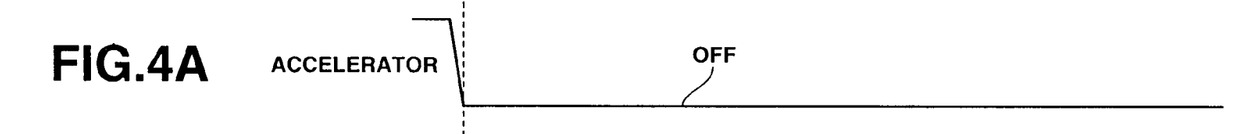
FIGS. 4A, 4B, 4C, 4D, and 4E are integrally a timing chart of each signal during the learning driving mode of the variable valve control system shown in FIG. 2.
Figures 4B, 4C:
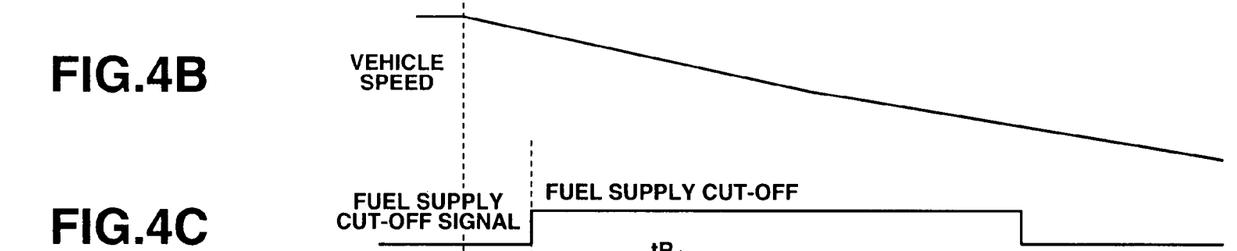
Figure 4D:
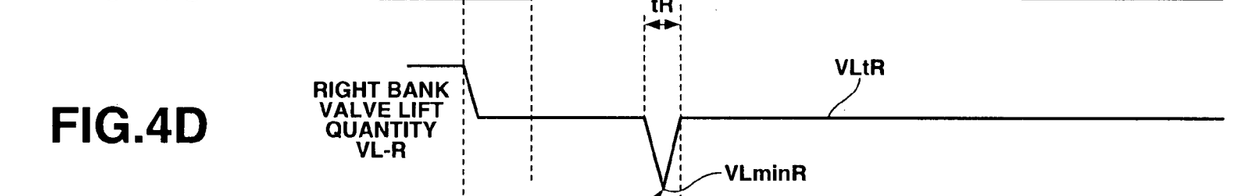
Figure 4E:
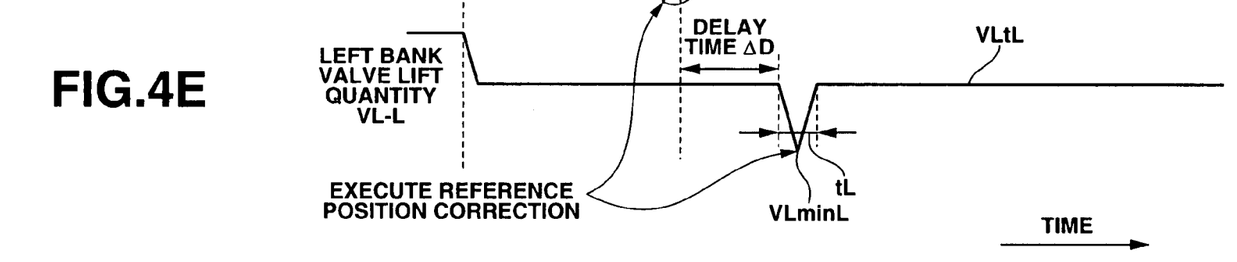

If the reference position learning condition is established (Yes) at step S1, the routine goes to a step S2. At step S2, engine control unit 19 determines whether a right bank learning end flag FlgR is set to "1". This right bank learning end flag FlgR is set to "1" when the learning process of the reference position for right bank RB is ended (a step S7) as will be described later. If not after the learning process for right bank RB, right bank learning end flag FlgR is reset to "0" and, in this case, the learning process for right bank RB is started. In FIG. 4D, tR corresponds to the learning timing for right bank RB (in FIG. 4E, tL corresponds to the learning timing for left bank LB). Specifically, at a step S3, engine control unit 19 manipulates control shaft 62R toward a minimum position in such a way that the valve lift (quantity or degree) of right bank RB indicates a minimum value VLminR of a predetermined characteristic. For example, control shaft 62R runs against a mechanical minimum position by giving engine control unit 19 a target value which is further smaller than a minimum target value of the rotation position of control shaft 62R in the ordinary engine driving state. In this embodiment, in order to secure widely an operable range of the valve lift (quantity or degree), minimum value VLminR of the valve lift (quantity or degree) is set to a value further lower than, for example, a target value VLtR (about 1.5 mm) during the vehicular deceleration fuel supply cut-off. This target value VLtR is a minimum target value of the control range used as a control target value. For example, minimum value VLminR is set to a minimum lift equal to or lower than 1 mm at which the intake air quantity is extremely small or substantially zero.

At the next step S4, engine control unit 19 determines whether the valve lift (quantity or degree) has reached to minimum value VLminR. For example, engine control unit 19 may determine whether valve lift (quantity) VL-R has reached to minimum value VLminR on the basis of the output signal of control shaft sensor 64R or on the basis of the intake air quantity. At a step S5, engine control unit 19 determines whether a predetermined time ΔTR has passed from a time at which a learning driving mode is started. In other words, a predetermined limitation time is provided for the learning process.

If the valve lift (quantity or degree) has reached to minimum value VLminR within predetermined time ΔTR, the routine goes from step S4 to a step S6 at which a minimum position of control shaft sensor 64R is actually learned (corrected). Specifically, the output signal of control shaft sensor 64R in a state in which valve lift (quantity or degree) VL-R is minimum value VLminR, namely, in the state in which control shaft 62 is placed at the minimum position is stored and updated in a back-up memory of engine control unit 19 as an output reference position of this control shaft sensor 64R. At step S7, engine control unit 19 sets right bank learning end flag FlgL to "1" and resets left bank learning end flag FlgL to "0". Then, the routine goes to a step S9. At step S9, engine control unit 19 manipulates (controls) control shaft 62 in such a way that right bank valve lift (quantity or degree) VL-R is directed toward an ordinary target value (target value during the vehicular deceleration fuel supply cut-off) VLtR.

It is noted that, in a case where valve lift (quantity) VL-R does not reach to minimum value VLminR even if predetermined time ΔTR has passed, the routine goes to a step S10 without processes of steps S6 through S9 for a fail safe reason.

At step S10, engine control unit 19 determines whether a predetermined delay (wait) time ΔD has passed. That is to say, predetermined delay time ΔD is provided between a time at which the sensor learning is ended for right bank RB and a time at which the sensor learning for left bank LB is started. Even if the valve lift (quantity or degree) is controlled toward the ordinary target value after the right bank sensor learning, a response delay is unavoidably involved until the intake air quantity is recovered to the predetermined quantity which accords with the target value. With such a response delay taken into consideration, the above-described delay time ΔD is set so that the left bank sensor learning is started after the intake quantity is sufficiently recovered. This delay time ΔD may be a preset fixed value or may be corrected in accordance with an engine coolant temperature.

If predetermined delay time ΔD has passed, the routine goes to a step S11. At step S11, engine control unit 19 determines whether left bank learning end flag FlgL is set to "1". After the right bank learning is ended, left bank learning end flag FlgL is reset to "0" at step S8. Hence, the routine goes to step S11 to start the sensor learning at left bank LB. That is to say, in the same way as steps S3 through S9 for right bank RB, engine control unit 19 manipulates control shaft 62L toward the minimum position so that the valve lift (quantity or degree) of the left bank gives minimum value VLminL (step S12). If valve lift (quantity or degree) VL-L of the left bank LB has reached to minimum value VLminL (steps S13 and S14), the routine goes to a step S15. At step S15, engine control unit 19 correctively learns the output signal of control shaft sensor 64L for left bank LB. Next, as reversed from the case of right bank RB, engine control unit 19 sets left bank learning flag to "1" at a step S16 and resets right bank learning end flag FlgR to "0" at a step S17. Next, the routine goes to a step S18. At step S18, engine control unit 19 controllably manipulates control shaft 62L in such a way that valve lift (quantity or degree) VL-L gives an ordinary target value VLtL. It is noted that, in a case where, even if a predetermined time ΔTL has passed, the valve lift (quantity or degree) VL-L does not reach to minimum value VLminL, this routine of FIG. 3 is ended for the fail safe reason without the learning process of steps S15 through S19.

As described above, the present invention has been described on the basis of the specific embodiment. However, the present invention is not limited to the above-described embodiment. Various changes and modifications may be made without departing from the scope of the present invention. For example, the present invention may be applied to variably operated valve mechanism installed for the exhaust valve 4. In addition, the present invention is applicable to phase variable mechanism 71. Although, in this embodiment, the sensor output corresponding to the reference position is stored and updated in the back-up memory as the learning value at step S6 and at step S15, the sensor output may be stored in a temporary memory as a correction value.

A technical concept, action, and advantages of the present invention will be described below.

(1) Each of variably operated valve mechanisms 2R, 21 which continuously varies the lift characteristic of intake valve 3 or exhaust valve 4 (engine valve) and the detecting section which detects the lift characteristic of engine valve (intake valve 3 or exhaust valve 4) (control shaft sensors 64R, 64L) are installed for a plurality of cylinder groups including at least a first cylinder group (e.g., right bank RB) and a second cylinder group (e.g., left bank LB). Under the predetermined learning driving state (step S1), engine control unit 19 manipulates the variably operated valve mechanism in such a manner that the lift characteristic of the variably operated valve mechanism indicates the predetermined characteristic (minimum value) (steps S3 through S12) and the reference position of the lift characteristic is learned or corrected (correctively learned) on the basis of the output signal of the detecting section (steps S4 through S9, steps S13 through S18). Then, first learning timing tR at which the learning or correction (the corrective learning) of the reference position for first cylinder group is carried out is differed (deviated) (step S10) from second learning timing tL at which the learning or correction (the corrective learning) of the reference position for second cylinder group is carried out. Thus, without any limitation on the control range of the lift characteristic, as compared with a case where the learning or correction for first cylinder group is carried out at the same timing as the learning or correction for second cylinder group, the reduction in the combustion stability due to the fact that the lift characteristic gives the predetermined characteristic (minimum value) during the learning or correction (the corrective learning) can be suppressed.

(2) The predetermined learning driving state is during the vehicular deceleration and the fuel supply cut-off state in which the fuel supply (injection) is stopped. In this way, the learning or correction (the corrective learning) is carried out during the fuel supply cut-off. In the same way as disclosed in the above-described Japanese Patent Application First Publication No. 2002-180856, the fuel consumption worsening along with the learning or correction (the corrective learning) can be prevented. In addition, the combustion stability and the responsive characteristic can be improved during the fuel recovery at which the fuel supply (injection) is resumed after the fuel supply cut-off.

(3) The cylinder group in which the learning or correction (the corrective learning) is carried out is controlled so that the learning or correction for the plurality of cylinder groups is sequentially carried out. In the above-described embodiment, the learning or correction for the left and right cylinder banks is carried out alternately utilizing flags FlgR and FlgL. Thus, an excessive learning or correction (corrective learning) is not carried out for a particular cylinder. An evenness learning or correction for each of the plurality of cylinder groups can be carried out. The shortening of the corrective learning for the whole cylinder groups can be achieved.

(4) Predetermined wait time ΔD is set between the time at which the learning or correction for the first learning group is ended and the time at which the learning or correction for the second learning group is started. This wait time ΔD is appropriately set so that the learning or correction for each of the cylinder groups can continuously be carried out without loss of the combustion stability and shortening of the learning or correction for the whole cylinder group can be achieved.

(5) The predetermined characteristic of the lift characteristic is typically minimum value of VLminR, VLminL of the lift characteristic.

(6) More specifically, minimum value VLminR, VLminL is the mechanical minimum value which is furthermore smaller than the minimum target value of the lift characteristic during the ordinary engine driving. In this case, even in the vicinity to the minimum target value of the lift characteristic, the lift characteristic can accurately be closed-loop controlled or feedback controlled on the basis of the detection signal. However, if the lift characteristic is the mechanical minimum value, the intake air quantity becomes excessively small so that the engine stability cannot sufficiently be secured. Hence, the present invention is extremely effective.

(7) Variably operated valve mechanism 2 includes variable valve event-and-lift mechanism 51 which continuously varies the valve lift (quantity or degree) and the working angle in accordance with the rotational position of control shaft 62 and the detecting section is control shaft sensor 64 to detect the rotational position of control shaft 62. In this way, according to the variable valve event-and-lift mechanism 51 which can continuously vary the valve lift (quantity or degree) and the working angle, the intake air quantity can remarkably be modified. However, there is a tendency that the intake air quantity becomes extremely reduced during the learning or correction (corrective learning). In this respect, the present invention is extremely effective.

(8) Variable valve event-and-lift mechanism 51 includes: control eccentric shaft portion 68 installed eccentrically on control shaft 62; rocker arm 56 swingably fitted to control eccentric shaft portion 68; drive shaft 52 which is rotated and interlocked with the crankshaft (which is rotatable with the engine revolution); swing cam 59 swingably fitted to drive shaft 52 and which opens or closes intake valve 3 or exhaust valve 4; first link 54 which links between drive eccentric shaft portion 53 and one end of rocker arm 56; and second link 58 which links between the other end of rocker arm 56 and a tip of swing cam 59. In such a variable valve event-and-lift mechanism 51 as described above, many of linkage portions of each link element are surface contacts. Hence, a lubrication is easy and they are superior in reliability and durability. In addition, since biasing means such as a return spring is not needed to be used, the above-described mechanism is simple in structure, is a reduced energy loss, and is superior in reliability and durability. Drive shaft 52 and swing cam 59 can be arranged at the same positions as the camshaft and cam driver as a well known direct-acting valve train. Thus, the variable valve control system according to the present invention is easily applicable to the direct-acting valve train without a remarkable layout change.

The entire contents of a Japanese Patent Application No. 2004-129462 (filed in Japan on Apr. 26, 2004) are herein incorporated by reference. The scope of the invention is defined with reference to the following claims.

What is claimed is:

1. A variable valve control system for a vehicular multi-cylinder internal combustion engine, comprising:
    a variably operated valve mechanism that continuously varies a lift characteristic of an engine valve for each of a plurality of cylinder groups including at least a first cylinder group and a second cylinder group;
    a detecting section that detects the lift characteristic of the engine valve; and
    a learning section that manipulates a valve lift quantity for each of the first and second cylinder groups in such a manner that the lift characteristic of the engine valve by the variably operated valve mechanism provides a predetermined characteristic under a predetermined learning driving state and correctively learns a reference position of the lift characteristic on the basis of an output signal of the detecting section, a first learning timing at which the reference position is learned for the first cylinder group being deviated from a second learning timing at which the reference position is learned for the second cylinder group.

2. A variable valve control system for a vehicular multi-cylinder internal combustion engine as claimed in claim 1, wherein the predetermined learning driving state is a fuel supply cut-off state during a vehicular deceleration.

3. A variable valve control system for a vehicular multi-cylinder internal combustion engine as claimed in claim 1, wherein the variable valve control system further comprises a controlling section that controls each of the cylinder groups for which the learning section learns the reference position of the lift characteristic in such a manner that the corrective learning for the plurality of cylinder groups is sequentially carried out.

4. A variable valve control system for a vehicular multi-cylinder internal combustion engine as claimed in claim 1, wherein a predetermined wait time is set between a time point at which the corrective learning for the first cylinder group is ended and another time point at which the corrective learning for the second cylinder group is started.

5. A variable valve control system for a vehicular multi-cylinder internal combustion engine as claimed in claim 1, wherein the predetermined characteristic is a minimum value of the lift characteristic.

6. A variable valve control system for a vehicular multi-cylinder internal combustion engine as claimed in claim 5, wherein the minimum value of the lift characteristic is a mechanical minimum value which is further smaller than a minimum target value of the lift characteristic during an ordinary engine driving.

7. A variable valve control system for a vehicular multi-cylinder internal combustion engine as claimed in claim 1, wherein the variably operated valve mechanism comprises a variable valve event-and-lift mechanism that continuously varies a valve lift quantity of the engine valve and a working angle thereof in accordance with a rotational position of a control shaft and the detecting section comprises a control shaft sensor to detect the rotational position of the control shaft.

8. A variable valve control system for a vehicular multi-cylinder internal combustion engine as claimed in claim 7, wherein the variable valve event-and-lift mechanism comprises: a control eccentric shaft portion installed eccentrically on the control shaft; a rocker arm (56) swingably fitted to the control eccentric shaft portion; a drive shaft rotatable with an engine revolution; a swing cam swingably fitted to the drive shaft and that opens or closes the engine valve; a first link that links between drive eccentric shaft portion and one end of the rocker arm; and a second link that links between the other end of the rocker arm and a tip of the swing cam.

9. A variable valve control system for a vehicular multi-cylinder internal combustion engine as claimed in claim 1, wherein the engine is a V shaped engine and the first cylinder group is one of right and left cylinder banks and the second cylinder group is the other of the right and left cylinder banks and wherein the learning section manipulates the valve lift quantity for the one of the right and left cylinder banks in such a manner that the lift characteristic of the engine valve in the right cylinder bank provides a minimum value (VLminR, VLminL) under the predetermined learning driving state.

10. A variable valve control system for a vehicular multi-cylinder internal combustion engine as claimed in claim 9, wherein the learning section comprises a first determining section that determines whether the lift characteristic of the engine valve for the one of the right and left cylinder banks has reached to the minimum value (VLminR, VLminL) and a second determining section that determines whether a predetermined time ($\Delta TR$, $\Delta TL$) has passed from a time at which the learning section starts a learning driving mode for one of the right and left cylinder banks when the first determining section determines that the lift characteristic (VL-R, VL-L) of the engine valve for the one of the right and left cylinder banks does not reach to the minimum value (VLminR, VLminR).

11. A variable valve control system for a vehicular multi-cylinder internal combustion engine as claimed in claim 10, wherein the learning section correctively learns the reference position of the lift characteristic on the basis of the output signal of the detecting section when the first determining section determines that the lift characteristic (VL-R, VL-L) of the engine valve for the one of the right and left cylinder banks has reached to the minimum value (VLminR, VLminL) within the predetermined time ($\Delta TR$, $\Delta TL$).

12. A variable valve control system for a vehicular multi-cylinder internal combustion engine as claimed in claim 11, wherein the learning section correctively learns a minimum position of the detecting section when the first determining section determines that the lift characteristic (VL-R, VL-L) of the engine valve for the one of the right and left cylinder banks has reached to the minimum value (VLminR, VLminL) within the predetermined time ($\Delta TR$, $\Delta TL$).

13. A variable valve control system for a vehicular multi-cylinder internal combustion engine as claimed in claim 11, wherein the learning section does not correctively learn the reference position of the left characteristic when the first determining section determines that the lift characteristic (VL-R, VL-L) of the engine valve for the one of the right and left cylinder banks does not reach the minimum value (VLminR, VLminL) within the predetermined time ($\Delta TR$, $\Delta TL$).

14. A variable valve control system for a vehicular multi-cylinder internal combustion engine as claimed in claim 12, wherein a predetermined delay time (ΔD) is provided between a time at which the learning section correctively learns the reference position of the lift characteristic for the one of the right and left cylinder banks and another time at which the learning section correctively learns the reference position of the lift characteristic for the other of the right and left cylinder banks.

15. A variable valve control system for a vehicular multi-cylinder internal combustion engine as claimed in claim 12, wherein the detecting section is a control shaft sensor (64R, 64L) to detect a rotational position of a control shaft of the variably operated valve mechanism (2R, 2L) for the one of the right and left cylinder banks.

16. A variable valve control system for a vehicular multi-cylinder internal combustion engine as claimed in claim 11, wherein the minimum value of the lift characteristic is a mechanical minimum value which is smaller than a minimum target value of the lift characteristic during an ordinary engine driving.

17. A variable valve control system for a vehicular multi-cylinder internal combustion engine as claimed in claim 11, wherein the learning section further comprises a manipulating section (S9, S18) that manipulates the valve lift quantity for the one of the right and left cylinder banks toward an ordinary target value (VLtR, VLtL) after the learning section learns the reference position of the lift characteristic.

18. A variable valve control system for a vehicular multi-cylinder internal combustion engine as claimed in claim 9, wherein the engine valve is an intake valve.

19. A variable valve control method for a vehicular multi-cylinder internal combustion engine, comprising:
    providing a variably operated valve mechanism that continuously varies a lift characteristic of an engine valve for each of a plurality of cylinder groups including at least a first cylinder group and a second cylinder group;
    providing a detecting section that detects the lift characteristic of the engine valve;
    manipulating a valve lift quantity for each of the first and second cylinder groups in such a manner that the lift characteristic of the engine valve by the variably operated valve mechanism provides a predetermined characteristic under a predetermined learning driving state; and
    correctively learning a reference position of the lift characteristic on the basis of an output signal of the detecting section, a first learning timing at which the reference position is learned for the first cylinder group being deviated from a second learning timing at which the reference position is learned for the second cylinder group.

20. A variable valve control system for a vehicular multi-cylinder internal combustion engine, comprising:
    a variably operated valve mechanism that continuously varies a lift characteristic of an engine valve for each of a plurality of cylinder groups including at least a first cylinder group and a second cylinder group;
    detecting means for detecting detects the lift characteristic of the engine valve; and
    manipulating means for manipulating a valve lift quantity for each of the first and second cylinder groups in such a manner that the lift characteristic of the engine valve by the variably operated valve mechanism provides a predetermined characteristic under a predetermined learning driving state; and
    correctively learning means for correctively learns a reference position of the lift characteristic on the basis of an output signal of the detecting section, a first learning timing at which the reference position is learned for the first cylinder group being deviated from a second learning timing at which the reference position is learned for the second cylinder group.

* * * * *